United States Patent
Mondello et al.

(10) Patent No.: US 11,456,880 B2
(45) Date of Patent: Sep. 27, 2022

(54) CRYPTOGRAPHICALLY SECURE MECHANISM FOR REMOTELY CONTROLLING AN AUTONOMOUS VEHICLE

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 436 days.

(21) Appl. No.: 16/363,047

(22) Filed: Mar. 25, 2019

(65) Prior Publication Data

US 2020/0313908 A1 Oct. 1, 2020

(51) Int. Cl.

| | |
|---|---|
| H04L 9/32 | (2006.01) |
| H04W 4/46 | (2018.01) |
| H04L 9/30 | (2006.01) |
| H04L 9/08 | (2006.01) |
| G05D 1/00 | (2006.01) |
| H04W 12/06 | (2021.01) |
| G06F 16/953 | (2019.01) |

(Continued)

(52) U.S. Cl.
CPC ......... *H04L 9/3268* (2013.01); *G05D 1/0022* (2013.01); *G05D 1/0088* (2013.01); *H04L 9/0861* (2013.01); *H04L 9/30* (2013.01); *H04W 4/46* (2018.02); *G05D 2201/0213* (2013.01); *G06F 16/953* (2019.01);

(Continued)

(58) Field of Classification Search
CPC ....... G06F 16/953; H04L 9/3268; H04L 9/30; H04L 9/0861; H04L 9/3247; H04L 2209/38; H04L 2209/84; H04L 2209/80; H04L 9/3239; H04L 63/0823; H04W 4/46;

(Continued)

(56) References Cited

U.S. PATENT DOCUMENTS 9,769,658 B2 * 9/2017 Dolev ................... H04L 9/3278
10,158,480 B1 * 12/2018 Winklevoss ........ H04L 12/2803

(Continued)

FOREIGN PATENT DOCUMENTS

KR 20180022473 A 3/2018

OTHER PUBLICATIONS

England, Paul. et al., Device Identity with DICE and RIoT: Keys and Certificates, Microsoft, Sep. 2017, www.microsoft.com/en-us/research/publication/device-identity-dice-riot-keys-certificates/, Accessed May 21, 2021 (Year: 2017).*

(Continued)

*Primary Examiner* — Oleg Korsak
(74) *Attorney, Agent, or Firm* — Greenberg Traurig

(57) ABSTRACT

Disclosed are techniques for remotely controlling autonomous vehicles. In one embodiment, a method is disclosed comprising receiving a message from a first autonomous vehicle, the message including a signed body portion and a triple including components selected from the group consisting of a public identifier of the first autonomous vehicle, a public key of the first autonomous vehicle, and a certificate of the first autonomous vehicle; authenticating the message by verifying the certificate of the first autonomous vehicle; logging the message into a blockchain storage structure, the blockchain storage structure storing a plurality of blocks, each blocking including the signed body portion; and executing one or more orders included within the signed body portion.

14 Claims, 6 Drawing Sheets

(51) Int. Cl.
*H04W 84/18* (2009.01)
*H04L 9/00* (2022.01)

(52) U.S. Cl.
CPC .............. *H04L 9/3247* (2013.01); *H04L 9/50* (2022.05); *H04L 2209/80* (2013.01); *H04L 2209/84* (2013.01); *H04W 12/06* (2013.01); *H04W 84/18* (2013.01)

(58) Field of Classification Search
CPC ....... H04W 12/06; H04W 84/18; H04W 4/90; G05D 1/0022; G05D 1/0088
See application file for complete search history.

(56) References Cited

U.S. PATENT DOCUMENTS

| | | | |
|---|---|---|---|
| 10,169,587 B1 * | 1/2019 | Nix | G06F 21/57 |
| 10,356,088 B1 * | 7/2019 | Peddada | G06F 21/31 |
| 10,637,644 B1 * | 4/2020 | Walters | G06Q 20/065 |
| 2016/0167653 A1 | 6/2016 | Malone et al. | |
| 2016/0285864 A1 * | 9/2016 | Canavor | H04L 63/0823 |
| 2017/0141926 A1 * | 5/2017 | Xu | H04L 63/06 |
| 2018/0279105 A1 * | 9/2018 | Huber | B64C 39/024 |
| 2019/0230002 A1 * | 7/2019 | Bernat | H04L 63/0823 |
| 2019/0394050 A1 * | 12/2019 | Goeringer | H04L 9/3226 |
| 2020/0057872 A1 * | 2/2020 | Ingraham | H04L 9/3263 |

OTHER PUBLICATIONS

International Search Report and Written Opinion, PCT/US2020/021117, dated Jun. 25, 2020.

Stefan Hristozov, et al., "Practical Runtime Attestation for Tiny IoT Devices," Workshop on Decentralized IoT Security and Standards (DISS), Feb. 18, 2018.

* cited by examiner

CRYPTOGRAPHICALLY SECURE MECHANISM FOR REMOTELY CONTROLLING AN AUTONOMOUS VEHICLE

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed toward autonomous vehicles and, specifically, to systems and methods for remotely controlling an autonomous vehicle from another autonomous vehicle.

As autonomous vehicle technology continues to improve, more and more autonomous vehicles are operating on roadways. One problem unique to autonomous vehicles is how to appropriately respond to emergency vehicles. In a traditional scenario, a human operating a vehicle may recognize an emergency vehicle by visually identifying lights, audibly detecting sirens etc. The use may take culturally standardized actions (e.g., yielding to an ambulance) in response to this detection or the emergency signal may broadcast its request (e.g., via loud speaker). However, autonomous vehicles do not have the capabilities to process external stimuli in this manner. Specifically, no human operator may be present in an autonomous vehicle to act.

A rudimentary system may be employed using image recognition and audio recognition to classify a scene as including an emergency vehicle. Further, speech-to-text software may be used to convert audible instructions to commands. However, this approach and similar approaches suffer from serious security issues wherein a rogue vehicle can impersonate an emergency vehicle with minimal effort.

Thus, there exists a need to secure communications of emergency vehicles in an autonomous vehicle system and ensure that other non-emergency vehicles can securely receive, interpret, and respond to orders that affect the operation of the vehicle.

SUMMARY

Disclosed herein are techniques for controlling autonomous vehicles by emergency autonomous vehicles. The disclosed solutions utilize a cryptographically secure authentication system (e.g., DICE-RIoT) to ensure that all messages exchanged are verifiably signed by the sender. Messages are then reliably transmitted to vehicles over a secure channel and logged in a tamper-proof blockchain data structure.

In one embodiment, a method is disclosed comprising receiving a message from a first autonomous vehicle, the message including a signed body portion and a triple including components selected from the group consisting of a public identifier of the first autonomous vehicle, a public key of the first autonomous vehicle, and a certificate of the first autonomous vehicle; authenticating the message by verifying the certificate of the first autonomous vehicle; logging the message into a blockchain storage structure, the blockchain storage structure storing a plurality of blocks, each blocking including the signed body portion; and executing one or more orders included within the signed body portion.

In another embodiment, a non-transitory computer readable storage medium for tangibly storing computer program instructions capable of being executed by a computer processor is disclosed, the computer program instructions defining the steps of: receiving a message from a first autonomous vehicle, the message including a signed body portion and a triple including components selected from the group consisting of a public identifier of the first autonomous vehicle, a public key of the first autonomous vehicle, and a certificate of the first autonomous vehicle; authenticating the message by verifying the certificate of the first autonomous vehicle; logging the message into a blockchain storage structure, the blockchain storage structure storing a plurality of blocks, each blocking including the signed body portion; and executing one or more orders included within the signed body portion.

In another embodiment, a device is disclosed comprising a processor; and a storage medium for tangibly storing thereon program logic for execution by the processor, the stored program logic comprising logic performing the steps of: receiving a message from a first autonomous vehicle, the message including a signed body portion and a triple including components selected from the group consisting of a public identifier of the first autonomous vehicle, a public key of the first autonomous vehicle, and a certificate of the first autonomous vehicle; authenticating the message by verifying the certificate of the first autonomous vehicle; logging the message into a blockchain storage structure, the blockchain storage structure storing a plurality of blocks, each blocking including the signed body portion; and executing one or more orders included within the signed body portion.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
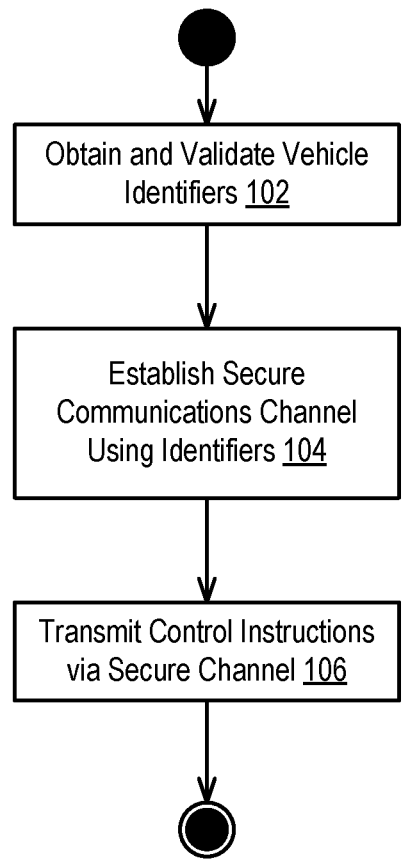
FIG. 1 is a flow diagram illustrating a method for remotely controlling an autonomous a vehicle using a cryptographically secure channel according to one embodiment of the disclosure.

FIG. 1 is a flow diagram illustrating a method for remotely controlling an autonomous a vehicle using a cryptographically secure channel according to one embodiment of the disclosure. Specific steps of the methods discussed in FIG. 1 are described in more detail in subsequent figures, the disclosure of which is incorporated by reference in its entirety in the discussion of FIG. 1.

In step 102, the method obtains and validates vehicle identifiers.

The vehicles involved in step 102 may comprise autonomous vehicles or, in some scenarios non-autonomous vehicles (collectively referred to as "vehicles"). Each vehicle is associated with an identifier. Traditionally, a vehicle can be identified using a vehicle identification number (VIN) pursuant to the ISO 3779 standard. While a VIN is useful for limited purposes (e.g., identification of stolen vehicles, proof of ownership) it is not useful for automated data processing activities, even if represented digitally.

In contrast to a VIN, the identifiers obtained in step 102 are cryptographically secure and generated identifiers. In general, a vehicle identifier comprises three parts a vehicle identifier, a public key, and a certificate.

The vehicle identifier comprises a string or other type of data that uniquely identifies the device that is identifying itself. In some embodiments, the vehicle identifier comprises a public key generated using a unique device secret (as described herein).

The public key and certificate are generated by an autonomous vehicle (as will be described herein). In one embodiment, both the public key and certificate are generated using a DICE-RIoT subsystem included within a processor installed in the autonomous vehicle. Details of the generation of a public key and certificate are described in more detail in the description of step 202 in FIG. 2.

In short, each vehicle (either autonomous or not) can be identified by data structure having a form:

$$\{ID_{L1public}, ID_{L1certificate}, K_{L1public}\} \quad \text{EQUATION 1}$$

This data structure is referred to as a "triple" for purposes of this disclosure. In some embodiments, the triple may also be associated with a freshness value. The freshness value may comprise a random string, monotonic counter, or other unique identifier that prevents replay attacks. Details of this freshness value are described in application U.S. patent application Ser. No. 16/363,088, filed Mar. 25, 2019 and entitled "VERIFYING IDENTITY OF AN EMERGENCY VEHICLE DURING OPERATION," the disclosure of which is incorporated herein by reference in its entirety.

As briefly discussed, in step 102, a given vehicle obtains and validates vehicle identifiers. Step 102 can be performed by a vehicle, such as an autonomous vehicle. For purposes of this disclosure, vehicles are categorized as generic vehicles and emergency vehicles. Emergency vehicles refer to vehicles performing emergency services. Often, such vehicles will be official vehicles (i.e., vehicles operated by a known emergency service provider such as a hospital, ambulance provider, fire department, police department, military, subcontractor of the same, etc.) but such vehicles may comprise ordinary vehicles operating under emergency conditions (e.g., a personal vehicle transporting a person in labor to a hospital). In some embodiments, a personal vehicle can request to be converted to an emergency via an out-of-band approval process. As will be understood, a triple associated with the personal vehicle can be used to secure "convert" the personal vehicle to an emergency vehicle. On the other hand, a generic vehicle broadly refers to any other non-emergency vehicle.

Specific techniques for recognizing vehicle triples vary depending on the sender and receiver. Two scenarios are described herein: (1) a generic vehicle recognizing (and, for example, yielding to) an emergency vehicle; and (2) an emergency vehicle recognizing (and, for example, commanding) a generic vehicle.

In the first scenario, a generic vehicle comprises an autonomous vehicle or a non-autonomous vehicle equipped with sufficient hardware to identify the emergency vehicle (e.g., a network interface and processor). In this scenario, the emergency vehicle transmits (e.g., broadcasts) its triple to the receiving vehicle (e.g., as part of a message wherein the message is signed using the emergency vehicle's private key). In one embodiment, an emergency vehicle can be equipped with a certificate during manufacturing to ensure that key and certificate generation can be performed offline.

In the second scenario, the generic vehicle could potentially be non-autonomous or, equally applicable, may not be currently transmitting its triple to any other devices. In this scenario, an emergency vehicle can utilize a camera or optical beam to capture an image of a license plate or other physically identifying characteristic. This characteristic can then be used to query a database that maps characteristics (e.g., license plate numbers) to valid triples. Communications with the database can be secured via transport layer security (TLS) or a similar protocol.

In both scenarios, the vehicle requiring another's identification obtains a triple and a message. In one embodiment, this message is signed using the sender's private key and, optionally, encrypted using the receivers public key. Since the message is signed using a private key, the method can validate the message and thus triple.

In step 104, a secure communications channel is established using the identifiers. In one embodiment, the method uses TLS to encrypt communications between the two vehicles identified in step 102. Detailed operations of TLS are beyond the scope of this disclosure and have been better described elsewhere. In general, TLS utilizes symmetric cryptography to encrypt data between parties. Prior to establishing a shared secret key using this symmetric cryptography, the parties authenticate themselves using public-key cryptography. As described above, the vehicles in step 102 authenticate themselves using the triples generated, for example, using a DICE-RIoT platform. In alternative embodiments, other secure channel technologies may be used such as QUIC, spiped, etc.

In step 106, the vehicles exchange messages such as control instructions via the secure channel established in step 104.

In one embodiment, all messages exchanged over the secure channel are digitally signed. In one embodiment, a sender (e.g., emergency vehicle) signs all control instruction message using its private key. Since the received has already received and validated the vehicle's public key, the receiver can authenticate the message using the senders public key, thus ensuring secure communications between vehicles.

Further, in some embodiments, control instructions may be encrypted by the sender. In this embodiment, the sender uses the public key exchanged during step 102 of the received to encrypt the control instructions. The received, owner of the private key, can use the private key to decrypt the control instructions. In addition, the channel itself may be secured by TLS or another suitable encryption scheme.

The aforementioned methods enable one autonomous vehicle to remotely control another via a secure connection wherein all vehicles are securely authenticated. The specific details of the above method are described in more detail herein in the subsequent figures.

Figure 2:
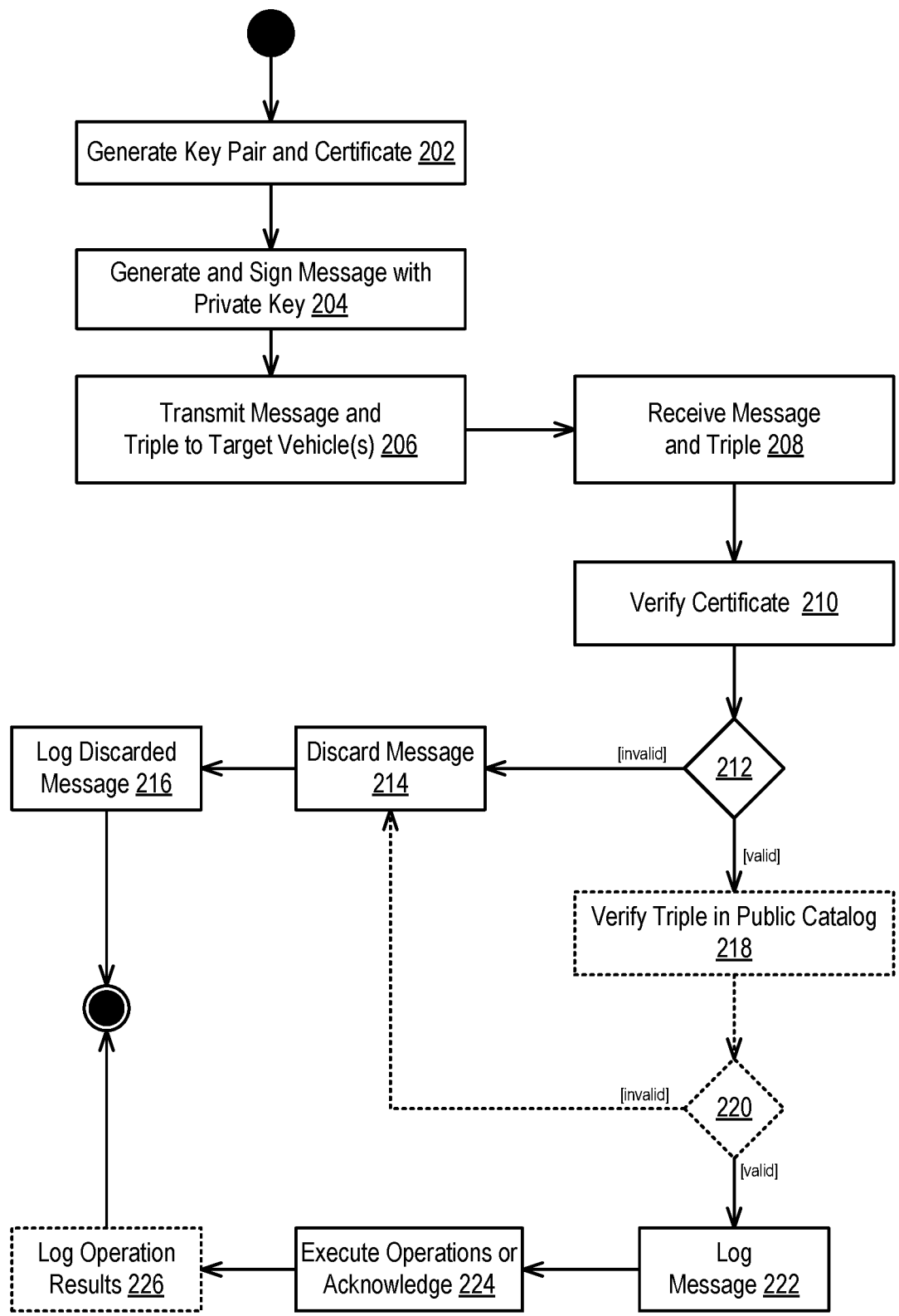
FIG. 2 is a flow diagram illustrating a method for authenticating and executing remote control instructions by an autonomous vehicle according to some embodiments of the disclosure.

FIG. 2 is a flow diagram illustrating a method for authenticating and executing remote control instructions by an autonomous vehicle according to some embodiments of the disclosure.

In step 202, the method generates a key pair and certificate. The generation of a key pair and certificate is described more fully in the description of FIGS. 4A and 4B, the disclosure of which is incorporated by reference in its entirety. In one embodiment, the key and certificate comprise an $L_1$ key and certificate generated based on the exported output of an $L_0$ bootloader.

In the illustrated embodiment, the key pair and certificate are generated by an emergency vehicle. In some embodiments, the emergency vehicle may have a key pair and certificate pre-installed by a manufacturer or operator of the vehicle.

However, in other embodiments, the key/certificate may comprise a higher-level key/certificate. Specifically, in one embodiment, the message generated in step 204 may comprise a forwarding of an original message. In this embodiment, the method may generate an $L_2$ key pair/certificate using the $L_1$ key of a sender. The method may then use the $L_2$ key pair/certificate to forward the message to another device, ensuring that the chain of recipients is verified.

In step 204, the method generates and signs a message with the private key generated in step 202. In one embodiment, the message comprises, for example, an order by an emergency autonomous vehicle (e.g., to pull over, make way, stop all vehicles, stop a specific vehicle, etc.). In another embodiment, if a non-emergency vehicle is the sender, the message may comprise an acknowledgement of the message and, for example, service information regarding operations to be performed by the non-emergency vehicle (e.g., specifying a location or time when the order will be complied with, a refusal to accept due to overriding circumstances, etc.).

In some embodiments, the message may further be encrypted using the public key of the receiver. In these embodiments, a handshaking procedure may be employed to exchange public keys. Further, the public keys may be transmitted during the handshake as a triple which can be used to confirm the identity of the sender (as will be discussed). In addition to message-level encryption, the communications channel itself may be encrypted (e.g., by using a TLS connection).

In one embodiment, the method may further append a freshness indicator to the message prior to signing the message. In one embodiment, this freshness indicator prevents replay attacks and may comprise a unique value, monotonic counter, or other freshness indicators, as described above.

In step 206, the method transmits the message and a triple to the target vehicle or vehicles.

In one embodiment, the method may transmit a message using a dedicated short-range communications (DSRC) or 5GLTE network. In some embodiments, a vehicle ad-hoc network (VANET) may be used. In other embodiments, a centralized network may be used. Generally, a VANET may be used for rapid communications while a centralized network may be used for communications that are not time-critical. Certainly, both types of network (ad-hoc vs. centralized) may be used in combination (either mutually exclusively or in combination).

In one embodiment, the triple transmitted to a vehicle comprises the public key and certificate generated in step 202. In one embodiment, the method further generates a public identifier for the sender. The public identifier comprises a cryptographic identity of the device, distinct from a VIN or similar type of identifier. As described in FIG. 4A, the public identifier is generated using internal cryptographic features configuration sampled at each power-up of the device (thus only changing on the device power-up and not run-time while the cryptographic configuration changes due to eventual host commands. This public identifier is combined with the public key portion of the key pair and the certificate generated in step 202. Together, the triple and the signed message form a packet for remotely controlling an autonomous vehicle or, in other embodiments, responding to such a packet.

In one embodiment, an emergency vehicle may generate a triple in step 202 using the $L_1$ public key, public identifier, and certificate. After processing a message associated with this triple (discussed below), the receiver may send an acknowledgement using an $L_2$ public key, public identifier, and certificate of the receiver. As described in FIG. 4B, the $L_2$ public key, public identifier, and certificate are generated using the $L_1$ public key of the sender, thus further protecting the response from being spoofed or otherwise tampered with.

In step 208, the method receives the signed message and triple. In one embodiment, step 208 (and the remaining steps) may be performed by hardware of a receiving autonomous vehicle.

In step 210, the method verifies the certificate of the sender.

Figure 4A:
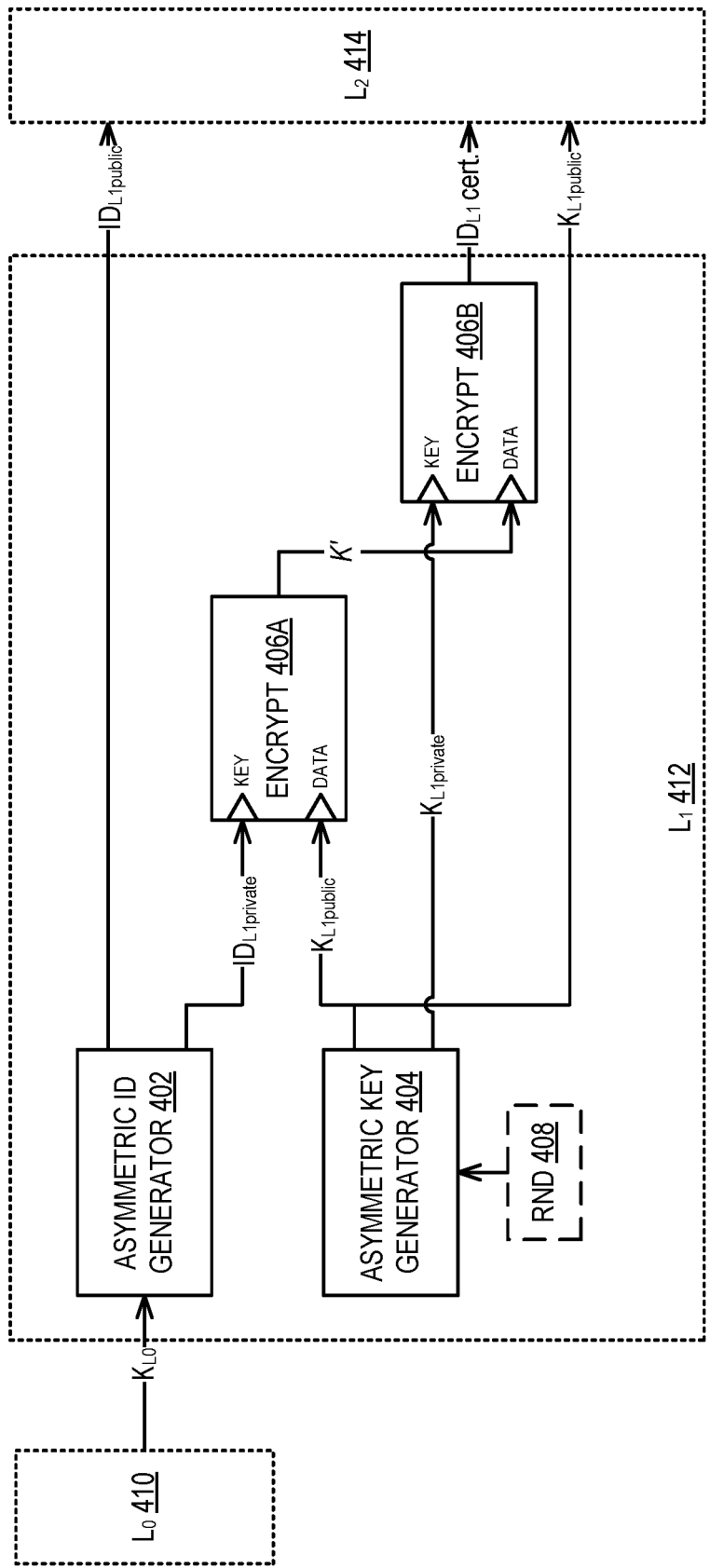
FIG. 4A illustrates an apparatus or non-transitory computer readable storage medium for generating a triple according to some embodiments.
Figure 4B:
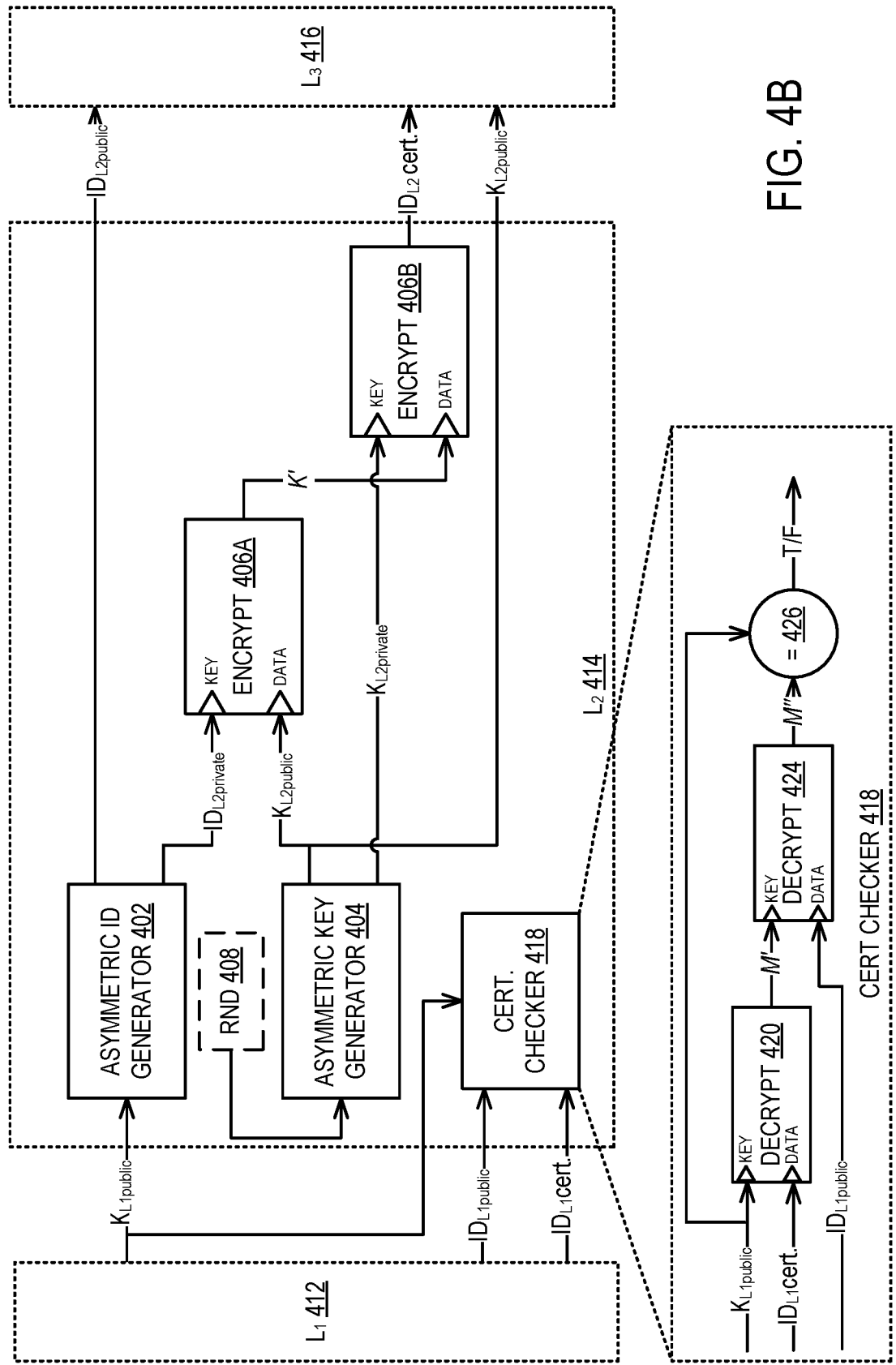
FIG. 4B illustrates an apparatus or non-transitory computer readable storage medium for verifying a triple and generating a second layer triple according to some embodiments.

Details of verifying a signature are described more fully in connection with FIG. 4B, the disclosure of which is incorporated herein by reference in its entirety. In brief, the method doubly decrypts the triple to confirm whether an output matches the public key of the triple. First, the method describes the certificate using the public key as the decryption key. The output of that decryption is then used as the key for a second decrypt stage while the data is the public identifier. The result is a candidate public key which is then compared to the public key of the triple. If the candidate public key and the triple public key are the same, the identity is confirmed.

In step 212, the method checks the output of the signature validation. If the certificate is invalid, the method discards the message (step 214). Otherwise, the method logs the message (222) (and, optionally, verifies the result in steps 218-220). In one embodiment, discarding a message may comprise simply refusing to obey the order. In the illustrated embodiment, the method additionally logs the discarded message (step 216). Alternatively, if the method determines the message is valid, the method executes the operations or, if receiving a response, acknowledges the message (step 224) and logs the operation results (step 226). These operations, and variations therein are described in more detail herein.

As described above (and herein) each message is associated with a public identifier, public key, and a certificate. Each message is additionally signed with the private key of the sender. Using public-key cryptography, the method decrypts the signature using the public key of the sender. In one embodiment, the method has previously authenticated that the public key in the triple is valid using a certificate checker (described in FIG. 4B). Thus, the method can securely verify both that the sender is who they claim to be (via a cryptographically secure identifier) and that the message was in fact created by the sender (by verifying the signature).

As illustrated in the Figure, the method logs messages, regardless of whether they are valid or invalid. In some embodiments, the method only logs valid messages (thus skipping step 216). In the illustrated embodiment, the log of messages is stored in a distributed database. In one embodiment, this distributed database comprises a blockchain data structure. In one embodiment, all emergency vehicles in a fleet may comprise nodes of the blockchain network and thus participate in a consensus algorithm for validating the messages. Details of the blockchain and block structure are described in detail in connection with FIG. 3, the disclosure of which is incorporated herein by reference.

In one embodiment, the method uses the blockchain as a secure, immutable ledger of valid commands executed in response to an emergency vehicle. Since this log is cryptographically tamper-proof, it may be used for later analysis by, for example, police, medical professionals, attorneys, and other entities needing a record of actions performed by both an emergency autonomous vehicle and other vehicles. For example, the blockchain may record what actions an autonomous vehicle took when transporting a patient to a hospital to determine if appropriate emergency measures were taken. Similarly, the blockchain may be analyzed to determine if a receiver of an emergency message responded accordingly or, if not, whether they had a valid reason for ignoring an emergency order.

Figure 3:
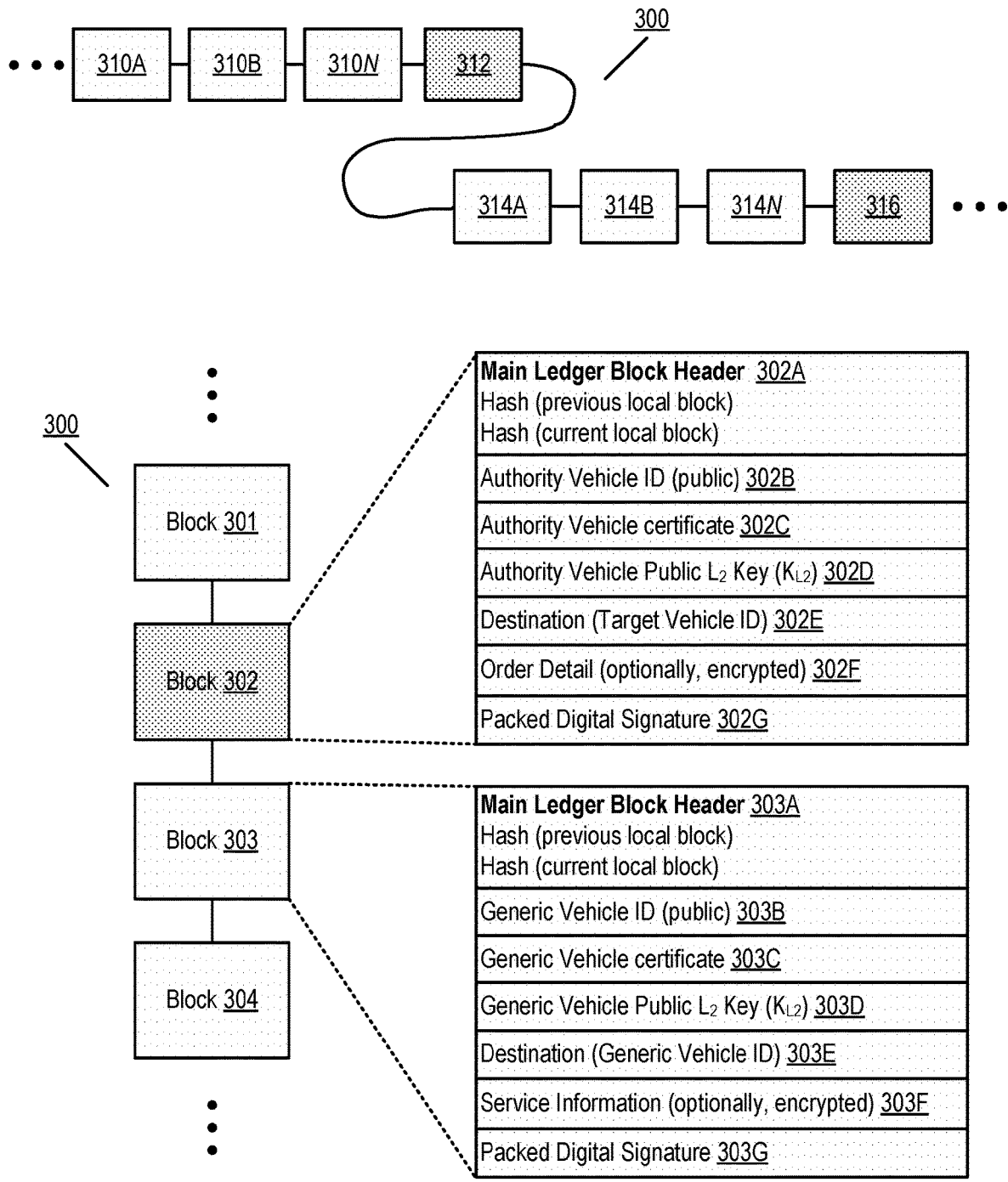
FIG. 3 is a diagram of a blockchain, including representative blocks, according to some embodiments of the disclosure.

In some embodiments, all autonomous vehicles may communicate via a single blockchain. In contrast to the previous embodiments, all vehicles will have access to the blockchain and are able to view blocks added to the blockchain. In this embodiment, step 222 may be performed before step 208 or, in some embodiments, as step 206. In this embodiment, a sender signs and proposes a block to be added to blockchain which is then received by all autonomous vehicles accessing the block chain. As illustrated in FIG. 3, the block structure includes a triple, message, and an identify of a receiver. Thus, instead of transmitting messages to a single autonomous vehicle in step 208, the sender broadcasts the messages to all vehicles access the blockchain. In this embodiment, the method may analyze the blockchain to confirm that the receiver has added their own block confirming the instructions. Notably, in this scenario, time may be of the essence and thus limited consensus may be needed. Thus, less computationally intensive algorithms may be used as compared to Proof of Work (PoW) which requires significant time and computing resources. For example, Proof of Authority (PoA) may be used to validate blocks. In a PoA scheme, recognized authorities can add blocks to the blockchain without general consensus. Since an emergency vehicle is well known, such a vehicle can act as an authority in this scheme, validating blocks added by itself and other vehicles that have received messages.

After logging a valid message, a receiver performs an action specified by the message. The action depends on the message and, in turn and practice, on the sender. If the sender is an emergency vehicle, the action will generally comprise an order to manipulate the vehicle subsystems of the autonomous vehicle (e.g., causing the vehicle to pull over, stop, re-route, etc.). If the receiver is an emergency vehicle, and the sender is a non-emergency vehicle, the message may include a notification of action the autonomous vehicle will take and may not include orders to the emergency vehicle. For example, the non-emergency autonomous vehicle may indicate a time the autonomous vehicle will pull over. The emergency autonomous vehicle may perform actions in response to the message but does not necessarily perform actions in the message. For example, continuing the previous example, the emergency autonomous vehicle may schedule an action by the vehicular subsystems based on knowing that a vehicle will pull over at a certain time and location.

Finally, in some embodiments, the method may further log a closing event (e.g., steps 216/226). These logs may be optional but may be used to bookend a set of transactions. For example, an emergency autonomous vehicle may log an order broadcast to five autonomous vehicles. The five autonomous vehicles may log their responses. Then the emergency autonomous vehicle may log a confirmation block confirming that the five responses were received. In some embodiments, the emergency autonomous vehicle may further log a second trailer block that confirms that the orders were actually followed.

In the illustrated embodiment, the method logs data to a blockchain data structure in multiple steps (216, 222, 226). In each step, as described above, logging data comprises adding a block to the blockchain data structure. In the illustrated embodiments, a block is recognized as part of the blocking (i.e., is included in the ledger) if two conditions are met. First, during insertion, the hash of the previous block must match the hash of the previous block as previously computed. That is, referring to FIG. 3, the "Hash (previous local block)" of header 303a must match "Hash (current local block)" of previous block 302a, before block 303 is inserted. In addition to this requirement, the block must satisfy a second, non-standard condition that the block be generated by an authorized host of the system. This particular requirement is, effectively, an alternative to proof-of-work in traditional blockchain systems (i.e., a mathematical competition among nodes), Specifically, in the illustrated blockchain, the nodes participating in the system attempt to guess the right signature to insert the block in the block chain. However, in the system, one entity in the system owns the private key used to generate the signature and thus can quickly "win" the competition (while the assertion is able to be validated by any other node using the private key owner's public key). In this manner, only the genuine signatory can win the competition, preventing unauthorized entry of blocks into the blockchain.

In an alternative embodiment, the method may further verify a triple using a public catalog of triples (218-220). The public catalog comprises a secure, centralized repository of triples operated by a trusted entity, similar to certificate authorities. In some embodiments, this method may be used in lieu of the verification in steps 210 and 212. Specifically, the use of a public catalog requires an internet connection and may be more reliable in such a scenario. However, when an internet connection is not available, steps 210 and 212 are still secure enough to confirm authenticity. In rare occasions however, an emergency vehicle may be decommissioned and thus while steps 210-212 will pass, a canonical store of triples will act as a safeguard against such a scenario. In some embodiments, the public catalog may be synchronized with autonomous vehicles whenever the autonomous vehicle is online. Thus, steps 218-220 may be performed locally with a cached copy of the catalog.

FIG. 3 is a diagram of a blockchain, including representative blocks, according to some embodiments of the disclosure.

In the illustrated embodiment, a blockchain (300) includes a plurality of blocks such as blocks 310a-310n, 312, 314a-312n, and 316. In one embodiment, blocks 310a-310n and 314a-312n comprise blocks proposed by non-emergency autonomous vehicles (described in more detail in connection with block 303). Interspersed with non-emergency autonomous vehicle blocks (310a-310n and 314a-312n) are emergency or authority vehicle blocks (312, 316).

These blocks are generated (and signed) by emergency autonomous vehicles. As illustrated, generic autonomous vehicle blocks (310a-310n, 314a-312n) may comprise response blocks to an initial emergency autonomous vehicle block (i.e., a block containing an order).

Blockchain (300) is alternatively illustrated with a plurality of blocks (301-304) wherein the block structure of two blocks (302, 203) is expanded. In one embodiment, blocks (302, 302) correspond to blocks (312, 314a).

In the illustrated embodiment, both blocks (302, 303) includes a main ledger block header (302a, 303a) that includes a hash of the current block and hash of the previous block. In the illustrated embodiment, the main ledger block header (302a, 303a) comprises a standard blockchain header for creating a linked list of transactions.

In the body of block (302, 303), a triple comprising the vehicle identifier (302b, 303b), certificate (302c, 303c), and public key (302d, 303d) are stored. This triple represents the autonomous vehicle that created the order detail (302f) or service information (303f). Additionally, the blocks (302, 303) include a destination public identifier (302e, 303e). This public identifier (302e, 303e) has been discussed previously, and comprises the receiver of the message send by the device identified by the triple (302b-302d, 303b-302d).

Finally, each block is signed by the sender and the signature is packed and included in the block as packed digital signature (302g, 303g). In the illustrated embodiment, the signature (302g, 303g) is signed using the senders private key and is verified by a receiver using the sender's public key.

The blocks additionally include order detail (302f) or service information (303f). The type of information in this field varies depending on the sender. Block (302) comprises a block containing an order broadcast (or otherwise transmitted) to other autonomous vehicles. In this scenario, the block (302) comprises a field that stores the commands or orders sent to the other vehicles. In contrast, block (303) comprises an acknowledgement or response from the autonomous vehicles receiving the order. Thus, the service information (303f) comprises a response to the order such as an affirmative or negative acknowledgement, details on how the autonomous vehicle plans on responding to the request etc.

FIG. 4A illustrates an apparatus or non-transitory computer readable storage medium for generating a triple according to some embodiments.

As illustrated, the $L_0$ software (410) and $L_1$ software (412) operate on a first device. The $L_0$ code (410) comprises firmware executing in ROM of the device. The $L_0$ code (410) is responsible for generating a first key ($K_{L0}$) (also referred to as a fuse-derived secret, FDS) according to the following formula:

$$FDS = K_{L0} = KDF(UDS, HASH(\text{identity of } L_1)) \quad \text{EQUATION 2}$$

where KDF is a one-way function such as an HMAC-SHA256 function, UDS is a unique device secret set during manufacture of the device operating the $L_0$ code (410), HASH comprises a second one-way function such as a SHA256 function, and the identify of $L_1$ comprises host configuration parameters of the $L_1$ code (412).

The $L_0$ code (410) exports $K_{L0}$ to the $L_1$ code (412) which is then used to generate a triple representing the $L_1$ code (412). This triple (depicted in EQUATION 1) is then exported by the $L_1$ code (412) to the $L_2$ code (414). As discussed, the $L_2$ code (414) can comprise code executing on an external device or, in some embodiments, a remote device. For example, the $L_0$ code (410) and $L_1$ code (412) can execute on a first autonomous vehicle while the $L_2$ (414) can execute on a separate autonomous vehicle.

Operation of the $L_1$ code (412) is described in more detail herein. Generally, as described, the $L_1$ code (412) is responsible for generating keys (referred to as "alias keys") and a triple for the $L_1$ code (412) itself.

As illustrated, the $L_1$ code (412) generates an identifier for the $L_1$ code (412) via an asymmetric identifier generator (402). The generator (402) takes the $K_{L0}$ key as a seed input and outputs a deterministic public key ($ID_{L1public}$) and private key ($ID_{L1private}$). The $L_1$ code (412) exports the public key ($ID_{L1public}$) to the $L_2$ code (414), the usage of which will be described in the description of FIG. 4B.

Additionally, the $L_1$ code (412) generates a second key pair using a second asymmetric key generator (404). This key generator (404) takes a random number generated the random number generator (408) as a seed input and outputs a second deterministic public key ($K_{L1public}$) and private key ($K_{L1private}$). The $L_1$ code (412) exports the public key ($K_{L1public}$) to the $L_2$ code (414), the usage of which will be described in the description of FIG. 4B.

The $L_1$ code (412) additionally employs a double-encryption technique for generating the ID certificate portion of the triple exported to the $L_2$ code (414). Specifically, the $L_1$ code (412) first encrypts the $K_{L1public}$ key using the $ID_{L1public}$ key as the encryption key using a first encryption module (406a), generating encrypted ciphertext K'. This ciphertext is then used as the data supplied to a second encryption module (406b) while the $K_{L1private}$ generated by the second generator (404) is used as the encryption key. The result of the second encryption module (406B) is a doubly-encrypted ciphertext K" which is exported as the $ID_{L1}$ certificate. The specific choice of encryption algorithm (and corresponding decryption algorithm in FIG. 4B) is not limited in the disclosure.

FIG. 4B illustrates an apparatus or non-transitory computer readable storage medium for verifying a triple and generating a second layer triple according to some embodiments. The figure illustrated in FIG. 4B illustrates the operation of $L_2$ code (414). However, the operations described herein can be generalized for any layer including and beyond the $L_2$ code (414) (e.g., $L_3$ code 416).

In the illustrated embodiment, the $L_2$ code (414) receives a triple from $L_1$ code (412), generated as described in FIG. 4A. $L_2$ code (414) performs operations similar to that of $L_1$ code (412) with respect to generating a $L_2$ triple and those details are not repeated herein but are incorporated by reference for identically numbered elements. One notable difference in the triple-generation circuity or software is that the first generator is seeded with the $K_{L1public}$ value generated by the $L_1$ code (412) and not the value of $K_{L0}$ (the fuse-derived secret) as described in FIG. 4A.

Additionally, the $L_2$ code (414) includes a certificate checker (418) which may be implemented in hardware (i.e., a dedicated circuit) or in software or firmware. Details of the certificate checker (418) are shown in exploded view in the figure. The certificate checker (418) verifies the authenticity of the triple received from the $L_1$ code (412). In some embodiments, the certificate checker (418) acts as a gating function to the remaining components (i.e., preventing the generation of an $L_2$ triple if the triple is not valid).

As illustrated, the certificate checker (418) decrypts the $ID_{L1}$ certificate using the $K_{L1}$ public key via first decryption module (420). The resulting key M' is then used as the key for a second decryption module (424) which use the key M' to decrypt the $ID_{L1}$ public key. Finally, the resulting plaintext M" is compared to the original public key ($K_{L1public}$) via comparator (426). If the result of the comparator is positive, the triple is confirmed as valid. If not, the triple is marked as invalid.

In the illustrated embodiment, the certificate checker (418) can execute independently of the triple generation circuity/software (402, 404, 406a-b). In this manner, triples of various entities can be verified by the $L_2$ code (414).

Figure 5:
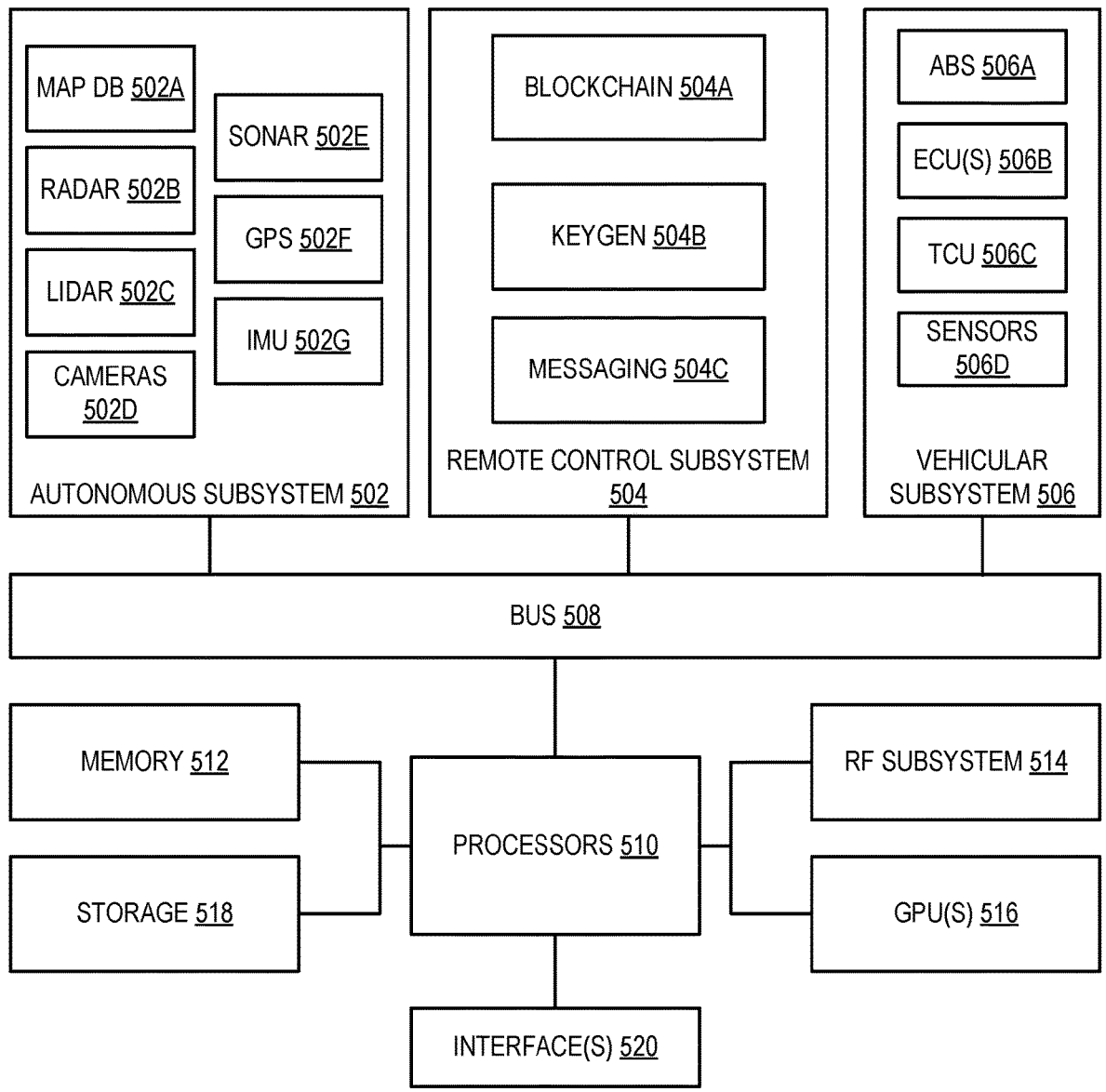
FIG. 5 is a block diagram of an autonomous vehicle according to some embodiments of the disclosure.

FIG. 5 is a block diagram of an autonomous vehicle according to some embodiments of the disclosure.

The system illustrated in FIG. 5 may be installed entirely within a vehicle. In some embodiments, some components (e.g., components and subsystems other than subsystem (504)) may comprise existing autonomous vehicle subsystems.

The system includes an autonomous vehicle subsystem (502). In the illustrated embodiment, autonomous vehicle subsystem (502) includes map database (502A), radar devices (502B), Lidar devices (502C), digital cameras (502D), sonar devices (502E), GPS receivers (502F), and inertial measurement units (502G). Each of the components of autonomous vehicle subsystem (502) comprise standard components provided in most current autonomous vehicles. In one embodiment, map database (502A) stores a plurality of high-definition three-dimensional maps used for routing and navigation. Radar devices (502B), Lidar devices (502C), digital cameras (502D), sonar devices (502E), GPS receivers (502F), and inertial measurement units (502G) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem (506) is additionally included within the system. Vehicular subsystem (506) includes various anti-lock braking systems (506A), engine control units (502B), and transmission control units (502C). These components may be utilized to control the operation of the autonomous vehicle in response to the streaming data generated by autonomous vehicle subsystem (502A). The standard autonomous vehicle interactions between autonomous vehicle subsystem (502) and vehicular subsystem (506) are generally known in the art and are not described in detail herein.

The processing side of the system includes one or more processors (510), short-term memory (512), an RF system (514), graphics processing units (GPUs) (516), long-term storage (518) and one or more interfaces (520).

The one or more processors (510) may comprise central processing units, FPGAs, or any range of processing devices needed to support the operations of the autonomous vehicle. Memory (512) comprises DRAM or other suitable volatile RAM for temporary storage of data required by processors (510). RF system (514) may comprise a cellular transceiver and/or satellite transceiver. Long-term storage (518) may comprise one or more high-capacity solid-state drives (SSDs). In general, long-term storage (518) may be utilized to store, for example, high-definition maps, routing data, and any other data requiring permanent or semi-permanent storage. GPUs (516) may comprise one more high throughput GPU devices for processing data received from autonomous vehicle subsystem (502A). Finally, interfaces (520) may comprise various display units positioned within the autonomous vehicle (e.g., an in-dash screen).

The system additionally includes a remote control subsystem (504) which performs all the remote control operations required by the methods illustrated in the preceding Figures. The remote control subsystem (504) includes a blockchain storage device (504a) which is connected to bus (508) and processes and stores blockchain data transmitted on the bus (508).

The remote control subsystem (504) additionally includes a key generator (504B). In one embodiment, key generator (504B) is configured with ROM-based components and software-based components to generate keys (including keys for multiple levels of a DICE-RIoT-based system).

The remote control subsystem (504) additionally includes a message processor (504C). In one embodiment, the message processor (504C) is configured to broadcast, singlecast, or multicast messages to one or more autonomous vehicles.

Each of the devices is connected via a bus (508). In one embodiment, the bus (508) may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
receiving, by a second autonomous vehicle, a message from a first autonomous vehicle, the message including a signed body portion and a triple, the signed body portion comprising an order to remotely control the second autonomous vehicle and the triple comprising a public identifier of the first autonomous vehicle, a public key of the first autonomous vehicle, and a certificate of the first autonomous vehicle, wherein the public identifier is generated at least in part on a unique device secret of the first autonomous vehicle and wherein the certificate comprises an encrypted ciphertext generated by encrypting the public key;
authenticating the message by verifying the certificate of the first autonomous vehicle;
logging the message into a blockchain storage structure, the blockchain storage structure storing a plurality of blocks, each blocking including the signed body portion;
executing one or more orders included within the signed body portion; and
transmitting a second message to the first autonomous vehicle, the second message including a second signed body portion that includes a response to the order to remotely control the second autonomous vehicle.

2. The method of claim 1, the triple generated using a Device Identity Composition Engine (DICE)-Robust Internet of Things (RIoT) core layer.

3. The method of claim 1, the signed body portion signed using a private key corresponding to the public key of the first autonomous vehicle.

4. The method of claim 1, the authenticating the message comprising doubly decrypting the triple to obtain a result and comparing the result to the public identifier.

5. The method of claim 1, the authenticating the message further comprising confirming an identity of the first autonomous vehicle by querying a remote database using the triple.

6. A non-transitory computer readable storage medium for tangibly storing computer program instructions capable of being executed by a computer processor, the computer program instructions defining steps of:
receiving, by a second autonomous vehicle, a message from a first autonomous vehicle, the message including a signed body portion and a triple, the signed body portion comprising an order to remotely control the second autonomous vehicle and the triple comprising a public identifier of the first autonomous vehicle, a public key of the first autonomous vehicle, and a certificate of the first autonomous vehicle, wherein the public identifier is generated at least in part on a unique device secret of the first autonomous vehicle and wherein the certificate comprises an encrypted ciphertext generated by encrypting the public key;
authenticating the message by verifying the certificate of the first autonomous vehicle;
logging the message into a blockchain storage structure, the blockchain storage structure storing a plurality of blocks, each blocking including the signed body portion;
executing one or more orders included within the signed body portion; and
transmitting a second message to the first autonomous vehicle, the second message including a second signed body portion that includes a response to the order to remotely control the second autonomous vehicle.

7. The non-transitory computer readable storage medium of claim 6, the triple generated using a Device Identity Composition Engine (DICE)-Robust Internet of Things (RIoT) core layer.

8. The non-transitory computer readable storage medium of claim 6, the authenticating the message comprising doubly decrypting the triple to obtain a result and comparing the result to the public identifier.

9. The non-transitory computer readable storage medium of claim 6, the authenticating the message further comprising confirming an identity of the first autonomous vehicle by querying a remote database using the triple.

10. A device comprising:
a processor; and
a storage medium for tangibly storing thereon program logic for execution by the processor, the stored program logic comprising logic performing steps of:
receiving, by a second autonomous vehicle, a message from a first autonomous vehicle, the message including a signed body portion and a triple, the signed body portion comprising an order to remotely control the second autonomous vehicle and the triple comprising a public identifier of the first autonomous vehicle, a public key of the first autonomous vehicle, and a certificate of the first autonomous vehicle, wherein the public identifier is generated at least in part on a unique device secret of the first autonomous vehicle and wherein the certificate comprises an encrypted ciphertext generated by encrypting the public key;
authenticating the message by verifying the certificate of the first autonomous vehicle;
logging the message into a blockchain storage structure, the blockchain storage structure storing a plurality of blocks, each blocking including the signed body portion;
executing one or more orders included within the signed body portion; and
transmitting a second message to the first autonomous vehicle, the second message including a second signed body portion that includes a response to the order to remotely control the second autonomous vehicle.

11. The device of claim 10, the triple generated using a Device Identity Composition Engine (DICE)-Robust Internet of Things (RIoT) core layer.

12. The device of claim 10, the authenticating the message comprising doubly decrypting the triple to obtain a result and comparing the result to the public identifier.

13. The device of claim 10, the authenticating the message further comprising confirming an identity of the first autonomous vehicle by querying a remote database using the triple.

14. The method of claim 4, wherein doubly decrypting the triple to obtain a result and comparing the result to the public identifier comprises:
decrypting the certificate of the first autonomous vehicle using the public key of the first autonomous vehicle to obtain a resulting key; and
decrypting the public identifier of the first autonomous vehicle using the resulting key to obtain the result.

* * * * *